(12) United States Patent
Hayashi et al.

(10) Patent No.: US 6,849,024 B2
(45) Date of Patent: Feb. 1, 2005

(54) STARTING CLUTCH AND METHOD OF CONTROLLING THE SAME

(75) Inventors: Yoshitaka Hayashi, Fujisawa (JP); Hiroshi Fukushima, Fujisawa (JP); Takao Obara, Fujisawa (JP); Minao Umeda, Maebashi (JP); Keeichi Minagi, Maebashi (JP); Masao Shoji, Fujisawa (JP); Yoshio Kinoshita, Shizuoka-ken (JP); Shiro Takeuchi, Shizuoka-ken (JP); Tadashi Watanabe, Kakegawa (JP); Hirofumi Nakagomi, Fukuroi (JP); Tatsuro Miyoshi, Fukuroi (JP); Shigeharu Nishimura, Shizuoka-ken (JP); Hiroshi Yabe, Kakegawa (JP); Nobuhiro Horiuchi, Fukuroi (JP)

(73) Assignees: NSK Ltd., Tokyo (JP); NSK-Warner K.K., Tokyo (JP)

( * ) Notice: Subject to any disclaimer, the term of this patent is extended or adjusted under 35 U.S.C. 154(b) by 0 days.

(21) Appl. No.: 09/985,669

(22) Filed: Nov. 5, 2001

(65) Prior Publication Data

US 2002/0086766 A1 Jul. 4, 2002

(30) Foreign Application Priority Data

Nov. 6, 2000 (JP) ......................................... 2000-337949

(51) Int. Cl.⁷ ............................. F16H 3/44; B60K 41/22; B60K 41/26; F16D 67/00

(52) U.S. Cl. ...................... 475/312; 475/313; 192/3.52; 192/219.1

(58) Field of Search ............................. 192/219–219.3, 192/3.52, 48.92; 475/312, 314, 315, 316

(56) References Cited

U.S. PATENT DOCUMENTS

| | | | | |
|---|---|---|---|---|
| 2,266,740 A | * | 12/1941 | Cotterman | 192/3.52 |
| 2,861,482 A | * | 11/1958 | Schjolin | 475/312 |
| 4,484,494 A | * | 11/1984 | Sakakibara | 475/312 |
| 4,610,181 A | | 9/1986 | Houley et al. | 74/792 |
| 4,637,272 A | * | 1/1987 | Teske et al. | 192/94 |
| 5,019,022 A | | 5/1991 | Uhlig et al. | 475/209 |
| 5,507,704 A | * | 4/1996 | Lasoen | 475/316 |
| 5,836,849 A | | 11/1998 | Mathiak et al. | 475/269 |
| 5,846,153 A | * | 12/1998 | Matsuoka | 192/3.52 |
| 6,059,682 A | * | 5/2000 | Friedmann et al. | 475/159 |
| 6,468,176 B1 | | 10/2002 | Antonov | 475/257 |

FOREIGN PATENT DOCUMENTS

| DE | 34 31 485 | 3/1986 |
|---|---|---|
| EP | 1 009 943 | 3/1999 |

* cited by examiner

Primary Examiner—Tisha Lewis
(74) Attorney, Agent, or Firm—Miles & Stockbridge P.C.

(57) ABSTRACT

A starting clutch includes a planetary mechanism; a first clutch for outputting a torque to an outer diameter portion of the planetary mechanism; a second clutch for outputting the torque to an intermediate portion of the planetary mechanism; and a lock mechanism for locking a reactive force from an inner diameter portion of the planetary mechanism.

89 Claims, 12 Drawing Sheets

STARTING CLUTCH AND METHOD OF CONTROLLING THE SAME

BACKGROUND OF THE INVENTION

1. Field of the Invention

The present invention relates to a starting clutch usable in place of a torque converter in an automatic transmission (including an automatic control manual transmission or a sequential manual transmission or the like) of an automobile or the like.

2. Related Background Art

Hitherto, in the automatic transmission, that is AT (automatic transmission), the start of the automobile has been performed by a torque transmission. The torque converter is effective in amplifying the torque and has been mounted on a vast number of AT automobiles because of the smooth torque transmission at the time of increasing or decreasing the torque.

On the other hand, the torque converter has such a drawback as to have a large amount of sliding at the time of increasing or decreasing the torque.

Thus, in recent years, it has been proposed that the starting clutch can be used in place of the torque converter. Further, by reducing a gear ratio and increasing the number of variable speeds, the amplification of the torque at a lower speed range has been attempted.

FIG. 11 is an axial sectional view of the conventional starting clutch. A starting clutch 201 is constituted by combining a damper 245 and a multi-plate clutch 211. The damper 245 has a spring 248. The multi-plate clutch 211 alternately arranges a friction plate 291 attached to an outer periphery of a hub 217 by spline fitting and a separator plate 292 attached to the inner periphery of a clutch case 215 by spline fitting and is supported by a snap ring 312. There is provided a piston 214, which thrusts against the separator plate 292 and the friction plate 291 and is supported to a non-thrust side by a return spring 311. Incidentally, this piston 214 operates by the fact that an oil chamber 256 is supplied with an oil pressure from oil passages 251, 252, 254 and 255.

The starting clutch 201 as described above is constituted in such a manner that the torque is inputted from a connecting portion with an engine output shaft and reaches a case 208 and the damper 245. An impact or a vibration is suctioned by the spring 248 of the damper 245 so as to transmit the torque to the clutch case 215. When the piston 214 operates here, its torque is outputted from the output shaft 240 through the friction plate 291 and the hub 217 from the separator plate 292.

In general, as an alternate of the torque converter of the automatic transmission, the starting clutch is used. The starting clutch is efficient as compared with the torque converter because of direct transmission of the torque. Nevertheless, it has long been pointed that its drawback is that it has no torque amplifying function.

SUMMARY OF THE INVENTION

Hence, it is an object of the present invention to provide a starting clutch with a transmission mechanism capable of outputting both a normal torque and an amplified torque.

In order to attain the above described object, a clutch of the present invention includes: a planetary mechanism; a first clutch which outputs a torque to an outer diameter portion of the above described planetary mechanism; a second clutch which outputs a torque to an intermediate portion of the above described planetary mechanism; and a lock mechanism which locks a reactive force from an inner diameter portion of the above described planetary mechanism.

Further, in order to attain the above described object, the control method of the starting clutch of the present invention is a control method of the starting clutch, including: the planetary mechanism; the first clutch which outputs the torque to the outer diameter portion of the above described planetary mechanism; the second clutch which outputs the torque to the intermediate portion of the above described planetary mechanism; and the lock mechanism which locks the reactive force from the inner diameter portion of the above described planetary mechanism, in which an amplified torque is outputted by fastening the above described first clutch and the above described one-way clutch.

Although the planetary mechanism includes a planetary roller, the planetary gear is used in the embodiments, since the planetary gear can bear a larger torque. Accordingly, the outer diameter of the above described planetary mechanism, the intermediate portion of the above described planetary mechanism and the inner diameter portion of the above described planetary mechanism are equivalent to a sun gear.

Although, a cone clutch, a lock-up clutch, a single disc clutch, two-way clutch or the like can be adapted for the lock mechanism which locks the reactive force from the inner diameter portion of the planetary mechanism, the one-way clutch is used in each embodiment. By using the one-way clutch, the starting clutch can be made simple, small in size and light in weight.

The starting clutch of the present invention is constituted in such a manner that the case and the first clutch are connected through the damper, the hub of the first clutch is integrated as a clutch case of the second clutch, the hub of the above described first clutch is connected to a ring gear and the hub of the second clutch is connected to a carrier, respectively, and the above described carrier is connected to the output shaft and, between the sun gear and a base member joined to fixed elements, the one-way clutch is intervened.

Furthermore, reverse rotation preventive mechanisms were provided in the starting clutch. One of the reverse rotation preventive mechanisms was constituted as a one-way clutch in which the outer periphery of the above described base member was taken as an inner ring orbital surface and the inner periphery of the hub of the second clutch as an outer ring orbital surface. The other one was constituted as the one-way clutch in which the outer periphery of the above described sun gear was taken as the inner ring orbital surface and the inner periphery of the hub of the above described second clutch as the outer ring orbital surface.

Now, the above described one-way clutch and reverse rotation preventive mechanism are substantially the same to each other and meant to include all kinds of one-way clutches including ratchets. However, in order to prevent mixing up both the two in the present specification, such a distinguishing way of expression is used.

Although, the cone clutch, the lock-up clutch, the single disc clutch, the two-way clutch or the like can be adapted for the first clutch and the second clutch, a wet type multi-disc clutch is used in the present embodiment, since by using the wet type multi-disc clutch, it is possible to obtain good frictional characteristic. Incidentally, though the first clutch and the second clutch can be adapted for whichever way to be arranged such as to be arranged in a radial direction, to be arranged in an axial direction, or to be arranged spaced apart, they were arranged in the radial direction for each embodiment. By arranging in the radial direction, it is possible to shorten axial dimensions. Also, in case of arranging in the axial direction, it is possible to shorten radial dimensions.

For biasing means for biasing a frictionally engaging element of the first clutch, oil pressure, rubber and various kinds of springs can be adapted. For biasing regulating means for regulating the biasing, rubber and various kinds of springs can be adapted. In each embodiment of the present invention, two methods can be adapted, one of which methods uses oil pressure for biasing means and a Belleville spring for biasing regulating means, and in the other method both biasing means and biasing regulating means are constituted by one Belleville spring. By using the Belleville spring, it is possible to obtain an adequate biasing force with a few space.

An operating mechanism includes all that can operate members in an axial direction. For example, a feed screw, a cam (includes a ball), air pressure or the like can be adapted. In the present embodiment, a motor-driven ball screw, an electromagnet, a lever were used. By making them as the operating mechanism, it is possible to make an accurate and fine control. In order to obtain a partially smooth sliding operation, a release bearing was also used together.

In some of embodiments, thrust means for fastening the first and the second clutches by thrusting the piston was provided. In this type of the embodiments, the operating mechanism is operated only when the first and second clutches are released and the piston is pushed back in defiance of the thrust of the above described thrust means. Accordingly, since it is enough to allow the operating mechanism to work only when the first and second clutches are released, it is possible to control a power loss of the automobile engine. While, in the embodiments to be hereinafter described, oil pressure is used for the operating mechanism, the power loss of the engine can be controlled similarly by the above described each operating mechanism other than the other.

The piston was integrally formed by a piston for the first clutch and a piston for the second clutch. By the integral forming, it is possible to make the mechanism small in size, light in weight and simple. Incidentally, in contrast to this, when the piston for the first clutch and the piston for the second clutch are formed as a separate body, respectively, it is possible for the piston to have a sufficient rigidity and an advantageous responsibility.

In each embodiment of the present invention, an operation is made smooth by intervening a bearing mechanism between each element so that wear and tear is prevented. Now, what is meant here by the bearing mechanism includes all kinds of bearings that are provided with the bearing mechanism. For the bearing used in a thrusting direction such as between the case and the clutch case, the sliding bearing such as a thrust washer, a needle bearing and a thrust ball bearing is mainly used and, for the bearing used for a peripheral direction such as the output shaft and fixed elements, the sliding bearing, the thrust ball bearing, a roller bearing or the like are mainly used.

DETAILED DESCRIPTION OF THE PREFERRED EMBODIMENTS

Each embodiment of the present invention will be described below with reference to the attached drawings.

First Embodiment

Figure 1:
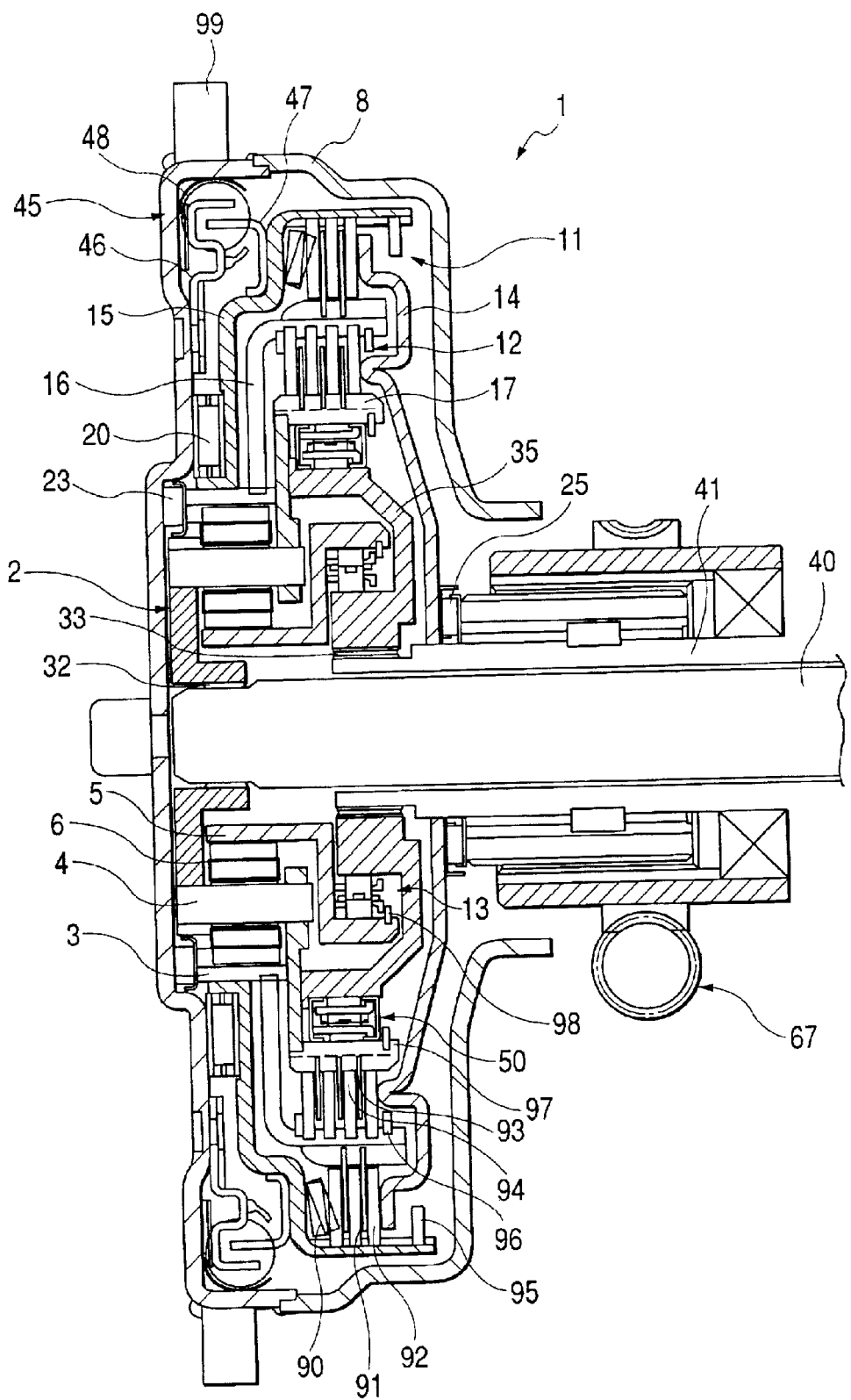
FIG. 1 is an axial sectional view showing a starting clutch of a first embodiment of the present invention.

FIG. 1 is an axial sectional view showing a starting clutch of a first embodiment of the present invention. A starting clutch 1 is constituted by a first clutch 11, a second clutch 12, a planetary gear 2 and a damper 45.

The first clutch 11 comprises: a case 8 in which a claw 47 of the damper 45 is fixed and a star gear 99 is provided on an outer periphery side; a clutch case 15 which is supported by the case 8 through a needle bearing 20; a separator plate 92 arranged in the inner periphery of the clutch case 15; a friction plate 91 arranged in the outer periphery of a clutch case 16 of a second clutch 12: and a Belleville spring 90 which is arranged in the inner periphery of the clutch case 15 and biases the separator plate 92 and the friction plate 91 to the piston 14 side.

In an opening end side of the clutch case 15, the separator plate 92, the friction plate 91 and a snap spring 95 for preventing the Belleville spring 90 from slipping off are arranged. The second clutch 12 comprises: the clutch case 16; a separator plate 94 arranged in the inner periphery of the clutch case 16; a hub 17; and a friction plate 93 arranged in the outer periphery of the hub 17. Similarly to the first clutch 11, the clutch case 16 is prevented from slipping off by a snap spring 96. The fastening of the first clutch 11 and the second clutch 12 is performed by the thrust load of the piston 14.

The planetary gear 2 as the planetary mechanism is constituted by a ring gear 3; a pinion gear 6 comprising three gears; a carrier 4 integrally maintaining each pinion gear 6; and a sun gear 5. On the outer periphery of the ring gear 3, the clutch case 16 of the second clutch 12 is spline-fitted, on the right side in the drawing of the carrier 4, the hub 17 is spline-fitted, and on the left side in the drawing of the carrier 4, the output shaft 40 is spline-fitted, respectively through a spline 32. Here, a needle bearing 23 intervenes between the ring gear 3 and the case 8.

The damper 45 was constituted by a retainer plate 46 fixed to the case 8; a claw 47 fixed to the outer periphery of the clutch case 15 of the first clutch 11; and a spring 48 intervened between the claw 47 of the retainer plate 46.

Furthermore, a base member 35 is fitted to a fixed element 41 by a spline 33. Between the base member 35 and the sun gear 5, an one-way clutch 13, which locks in a reverse direction to an input rotational direction from the first and second clutches 11 and 12, is arranged and, between the base member 35 and the hub 17, the reverse rotational preventive mechanism 50 is arranged, respectively. In order to prevent the one-way clutch 13 and the reversal rotation preventive mechanism 50 from slipping off, snap rings 98, 97 are arranged, respectively.

The piston 14 operates by the thrust of a ball screw mechanism 67. The ball screw mechanism 67 is arranged on the outer periphery of the fixed element 41, and between the ball screw mechanism 67 and the piston 14, a needle bearing 25 is intervened.

Second Embodiment

Figure 2:
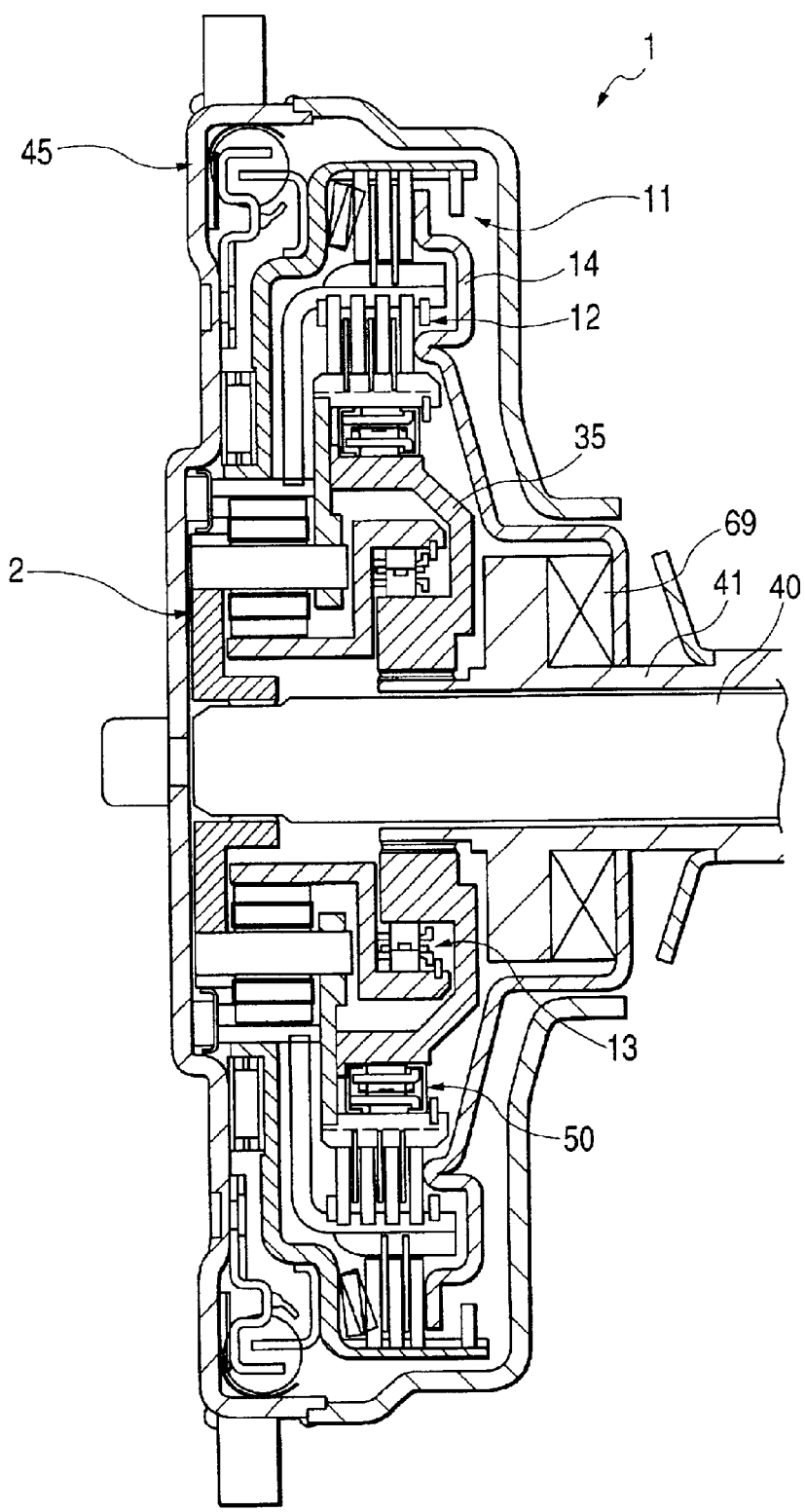
FIG. 2 is an axial sectional view showing the starting clutch of a second embodiment of the present invention.

FIG. 2 is an axial sectional view showing a starting clutch of a second embodiment of the present invention. In the second embodiment, the operation of the piston 14 is performed by an electromagnet 69 in place of the ball screw mechanism 67 of the first embodiment. The electromagnet 69 is controlled to ON/OFF by a control circuit not shown. In place of the electromagnet, an electromagnetic type solenoid can be also used. Since the constitution other than the thrust means of the piston 14 is the same as that of the first embodiment, the description thereof will be omitted.

Third Embodiment

Figure 3A:
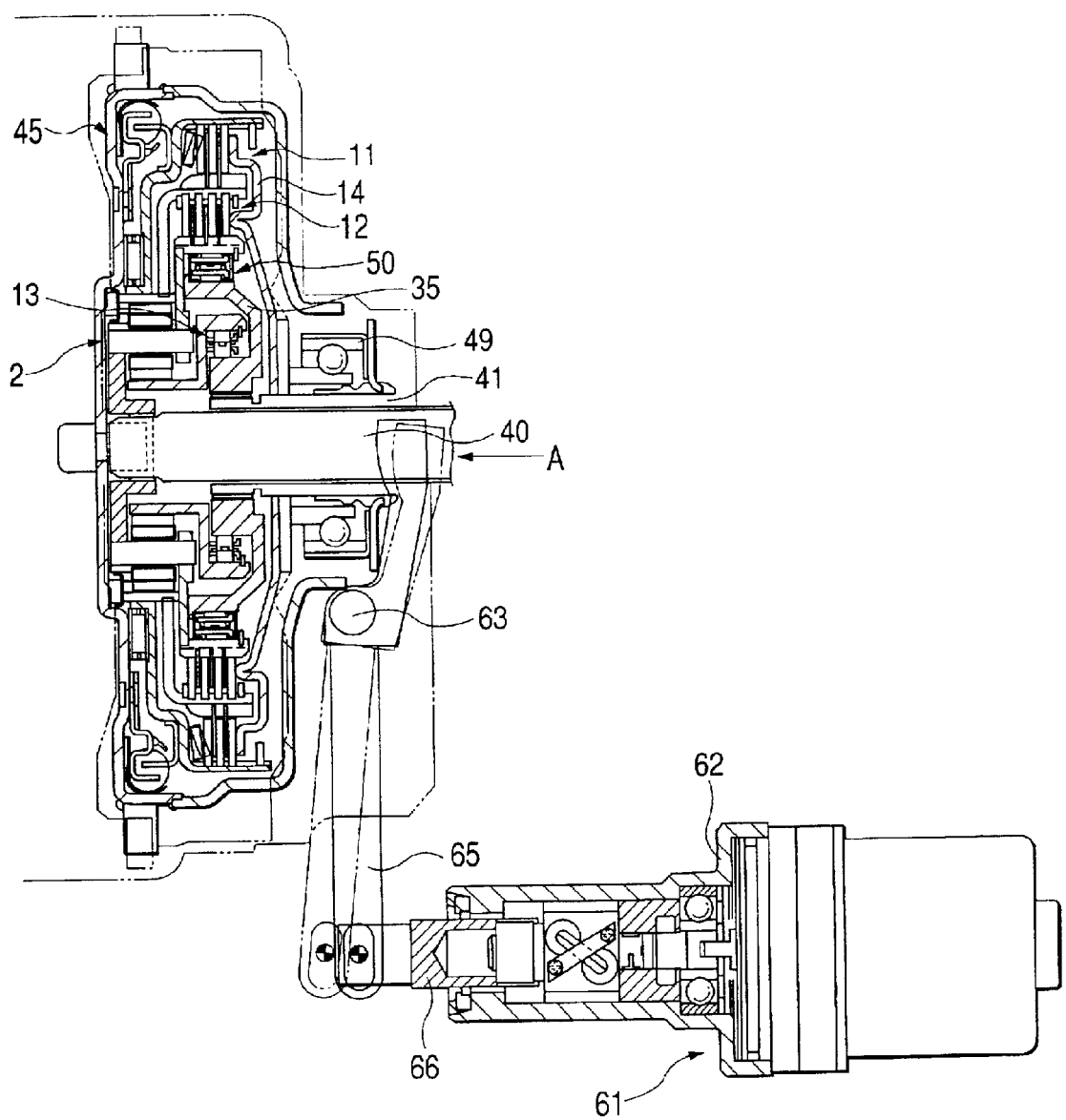
FIG. 3A is an axial sectional view showing the starting clutch of a third embodiment of the present invention.
Figure 3B:
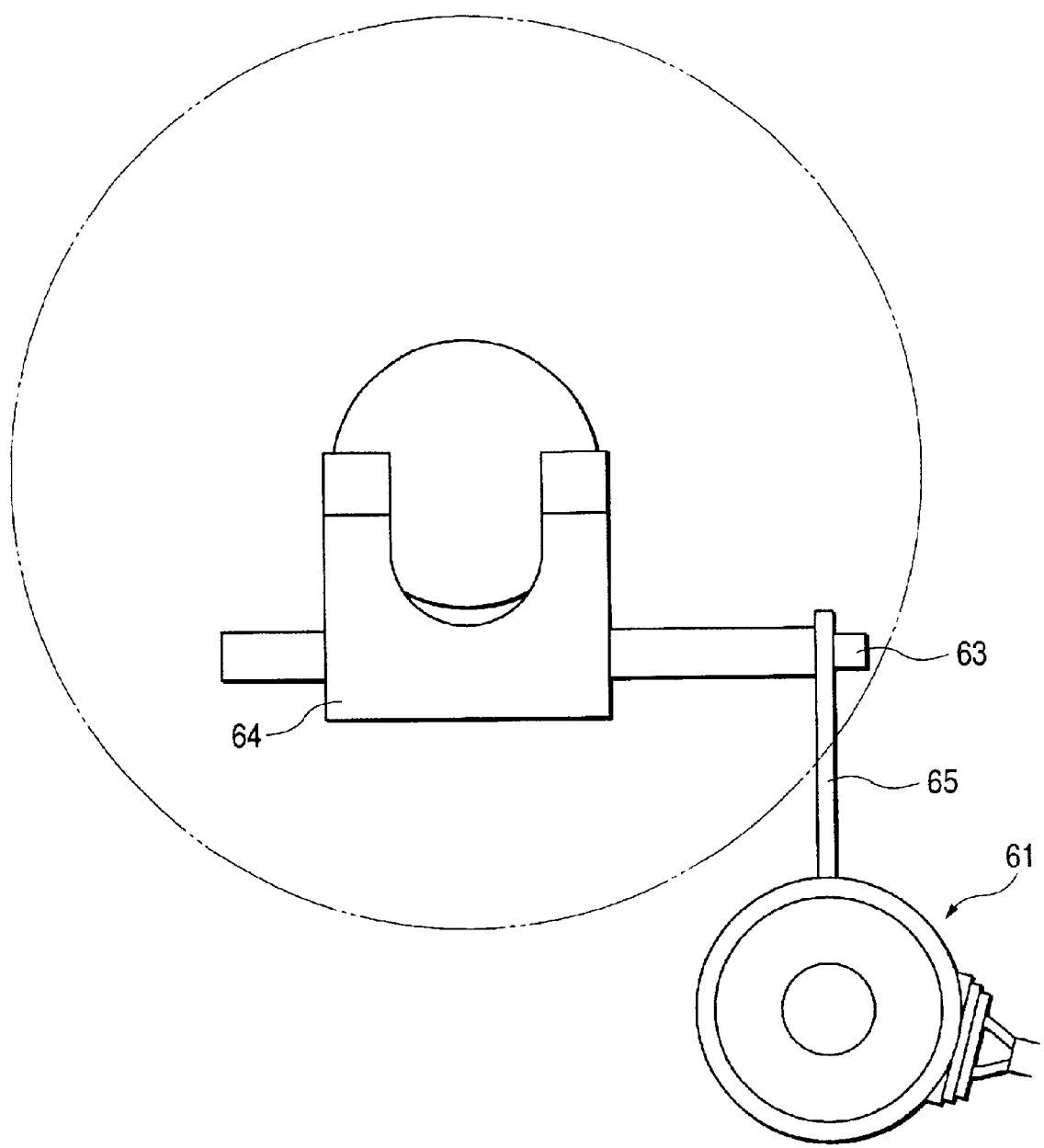
FIG. 3B is a view seen from a direction of an arrow mark A in FIG. 3A.

FIG. 3A is an axial sectional view showing a starting clutch of a third embodiment of the present invention. FIG. 3B is a view seen from a direction of an arrow mark A in FIG. 3A. In the third embodiment, the operating mechanism 61, which performs the thrust operation of the piston 14, is constituted by using the release bearing 49 and the ball screw 62. That is, by the operation of the ball screw 62, the release bearing 49 is thrust through a thrust shaft 66 of the ball screw 62, an arm 65, a support 63 and a lever 64. On this occasion, by utilizing the principle of the lever with the support 63 as a fulcrum, more larger thrust load can be obtained. Incidentally, since the constitution of the portion other than the operating mechanism 61 is the same as those of the above described first and second embodiments, the description thereof will be omitted.

Fourth Embodiment

Figure 4:
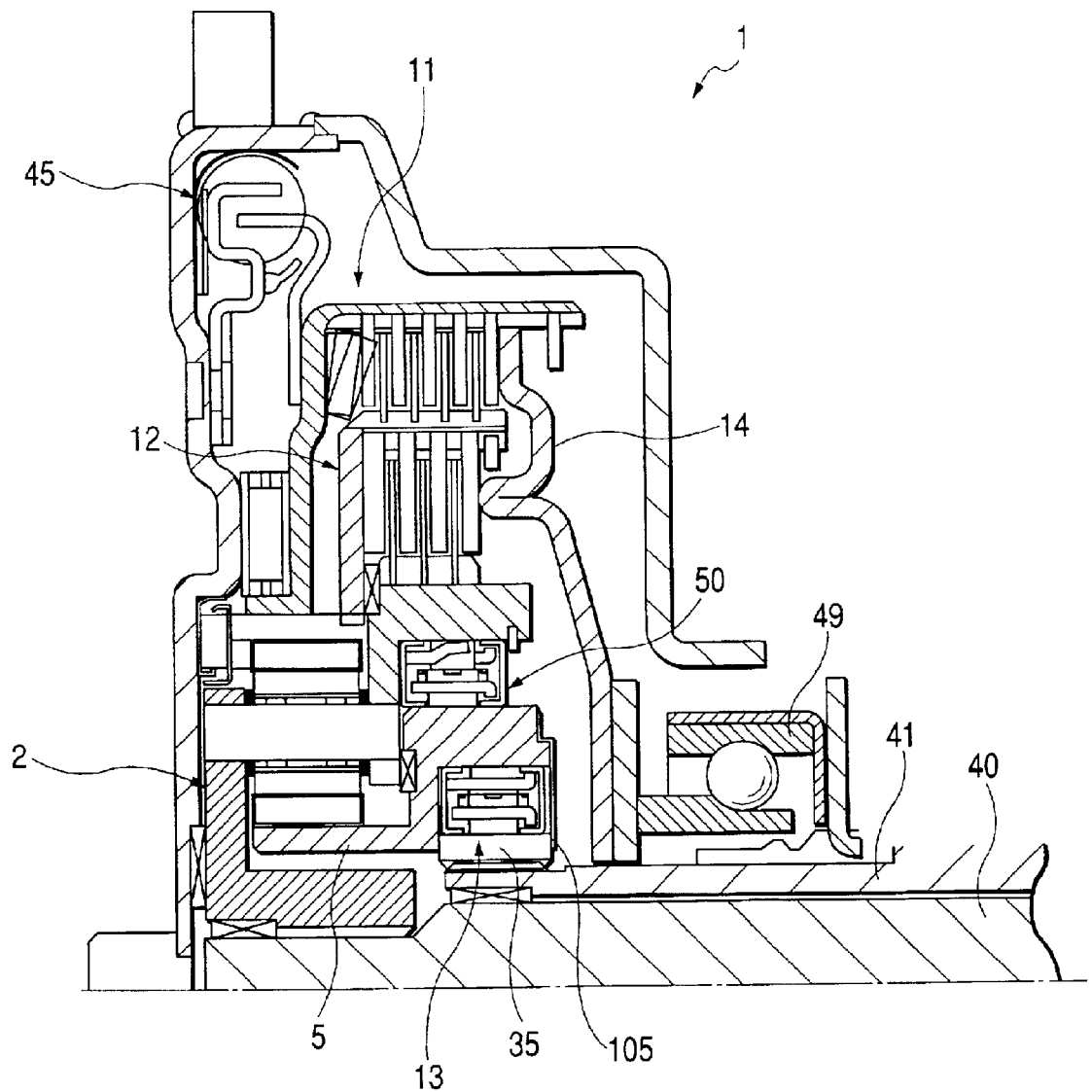
FIG. 4 is an axial sectional view showing the starting clutch of a fourth embodiment of the present invention.

FIG. 4 is an axial sectional view showing a starting clutch of a fourth embodiment of the present invention. The fourth embodiment has changed the arrangement of the one-way clutch 13 and the reverse rotation preventive mechanism 50 of the above described third embodiment. In the fourth embodiment, the outer periphery of the base member 35 was formed as an inner ring portion of the one-way clutch 13 and the outer periphery of the sun gear 5 was formed as an inner ring portion of the reverse rotation preventive mechanism 50. The side portion of the one-way clutch 13 is supported by a side plate 105 and not by the snap ring.

In order to make a smooth running of the automobile at the beginning, it is necessary to obtain a good half-clutch state in an intermediate state between a non-fastening and a complete fastening of the starting clutch. However, in order to adapt this state for the starting clutch of the above described first to fourth embodiments, in either one of the first clutch 11 and the second clutch 12, or bath of them, it is necessary to slidably move the frictionally engaging element. Also, by regulating a degree of the sliding movement, a creep of the automobile is generated, and when, in a manual transmission automobile, the driving force to the wheel was shut off while starting at a slope or the like, the generated creep becomes a hill holder mechanism (reverse rotation preventive mechanism) which prevents the automobile from falling back. When the fastening case and the non-fastening case are included, the relationship of the operating patterns of the first and second clutches 11 and 12, and the relationship of the operating patterns of the operating mechanisms 62, 67 and 69 are as shown in Table 1. Incidentally, X denotes the fastening of the clutch, Y the sliding movement of the clutch and Z the release of the clutch, respectively.

TABLE 1

| Operating mechanism | Completely ON | Half Operation | | | Completely OFF |
|---|---|---|---|---|---|
| First clutch | X | X | X | Y | Z |
| Second clutch | X | Y | Z | Z | Z |

Figure 5:
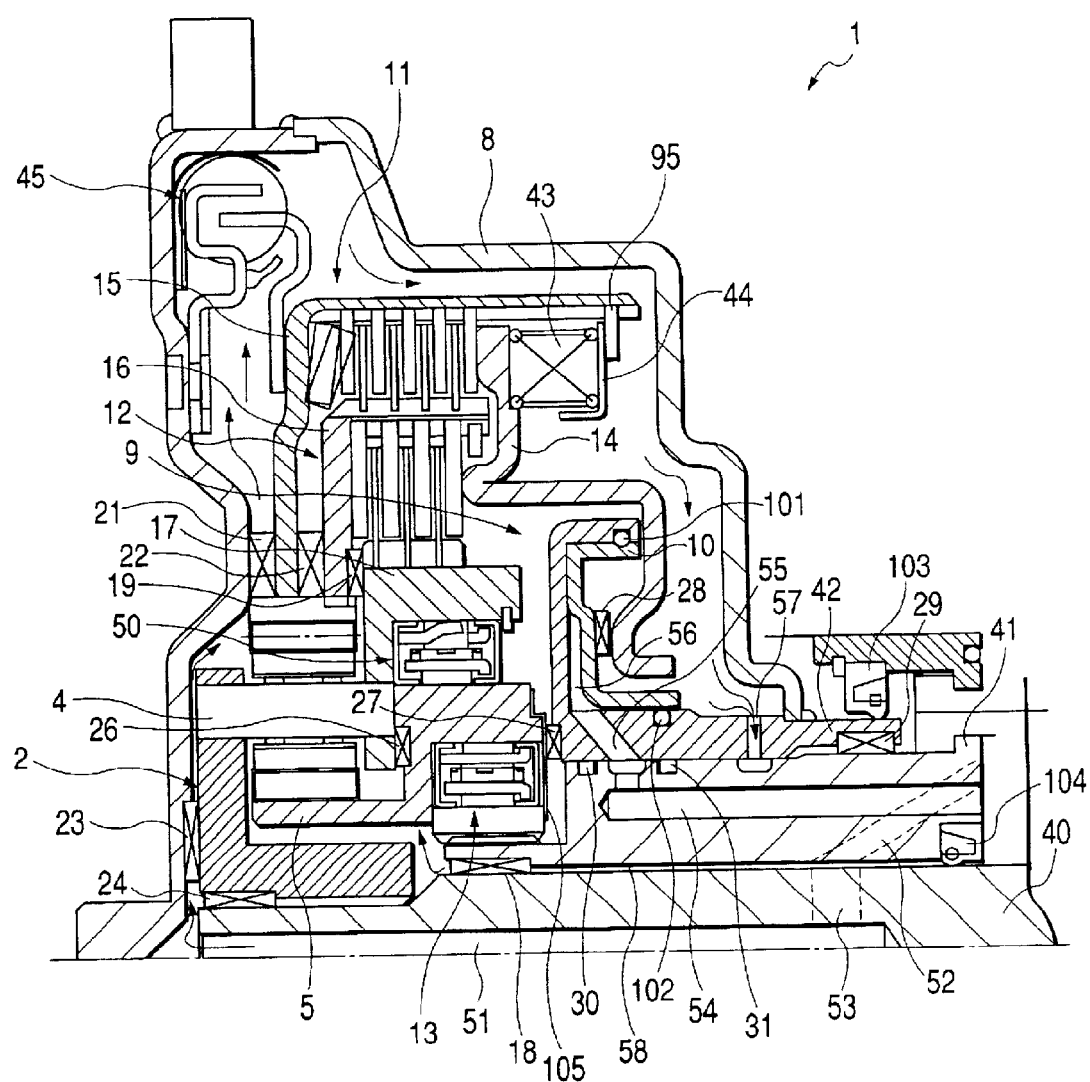
FIG. 5 is an axial sectional view showing the starting clutch of a fifth embodiment of the present invention.

FIG. 5 is an axial sectional view showing a starting clutch of a fifth embodiment of the present invention. The fifth embodiment greatly differs from the above described first to fourth embodiments in that the first and the second clutches are fastened by the thrust of mechanical thrust means in an oil-less state and a piston is operated in such a manner as to push back mechanical thrust means by supplying oil pressure. The practical constitution thereof will be described below.

The starting clutch 1 has a coupled driving rotational element 42, which integrally rotates with a case 8 on the outer periphery of a fixed element 41 on the outer periphery of an output shaft 40. The other end portion of the coupled driving rotational element 42 is folded up, and a cylinder 9 is formed by providing a cylinder plate 10 and O-rings 101 and 102 on this folded up portion. A piston 14 is provided in the cylinder plate 10 through a thrust or a needle bearing 28.

Between the cylinder plate 10 and the folded up portion of the coupled driving rotational element 42, an oil chamber 56 for generating oil pressure for operating the cylinder plate 10 and the piston 14 is provided. In order to supply oil pressure to the oil chamber 56, oil passages 54 and 55 are provided in the fixed element 41 and the coupled driving rotational element 42, respectively. Furthermore, on both sides of the connecting portion of the above described oil passage 54 and 55, seal bearings 30 and 31 are arranged.

The fifth embodiment adopts a wet type multi-plate clutch for a first clutch 11 and a second clutch 12, and since an one-way clutch 13 and a reverse rotational preventive mechanism 50 are provided, it is indispensable to lubricate each of these portions. This lubrication can be performed by keeping the inside of the case 8 in a lubricant immersed state or by oil bath of the above described each portion. In any case, it is needless to say that it is preferable that an oil is circulated and contaminants are removed via a filter (not shown). Hence, the present embodiment is so constructed that the fixed element 41 and the output shaft 40 are respectively provided with lubricant oil passages 52, 51 and 53, and lubricant is supplied from a gap 58 formed between the output shaft 40 and the fixed element 41, and from a suction port 57 provided in the coupled driving rotational element 42, the lubricant is recovered. Incidentally, the arrow mark shown inside the case 8 in the drawing shows a representative flow of the lubricant.

The piston 14 is thrust down to the left side in the drawing, that is, to a fastening direction of the first and second clutches 11 and 12 by a spring 43. The spring 43 is arranged between the piston 14 and a support plate 44, and the support plate 44 is prevented from slipping off by a snap spring 95. The piston 14 moves to the right direction in the drawing while pushing and shrinking the above described spring 43 by the above described cylinder 9, and releases the first and second clutches 11 and 12.

A thrust or a needle bearing 21 between a case 8 and a clutch case 15 of the first clutch 11, the thrust or a needle bearing 22 between the clutch case 15 of the first clutch 11 and a clutch case 16 of the second clutch 12, the thrust or a needle bearing 19 between the clutch case 16 of the second clutch 12 and a hub 17, the thrust or a needle bearing 23 between the case 8 and a planetary gear 2, the thrust or a needle bearing 26 between a carrier 4 of the planetary gear 2 and a sun gear 5, and the thrust or a needle bearing 27 between a side plate 105 arranged in the sun gear 5 and the coupled driving rotational gear 42 is provided, respectively.

Also, a bearing 24 between the sun gear 5 of the planetary gear 2 and the output shaft 40, a bearing 18 between the output shaft 40 and a fixed element 41, and a bearing 29 between the fixed element 41 and the coupled driving rotational element 42 is provided, respectively. A gap between the output shaft 40 and the fixed element 41 is sealed by a seal member 104, and the outer peripheral portion of the coupled driving rotational element 42 is sealed by a seal member 103, respectively. Incidentally, the arrangement of an one-way clutch 13 and a reversal rotation preventive mechanism 50 is the same as that of the above described fourth embodiment.

Sixth and Seventh Embodiment

Figure 6:
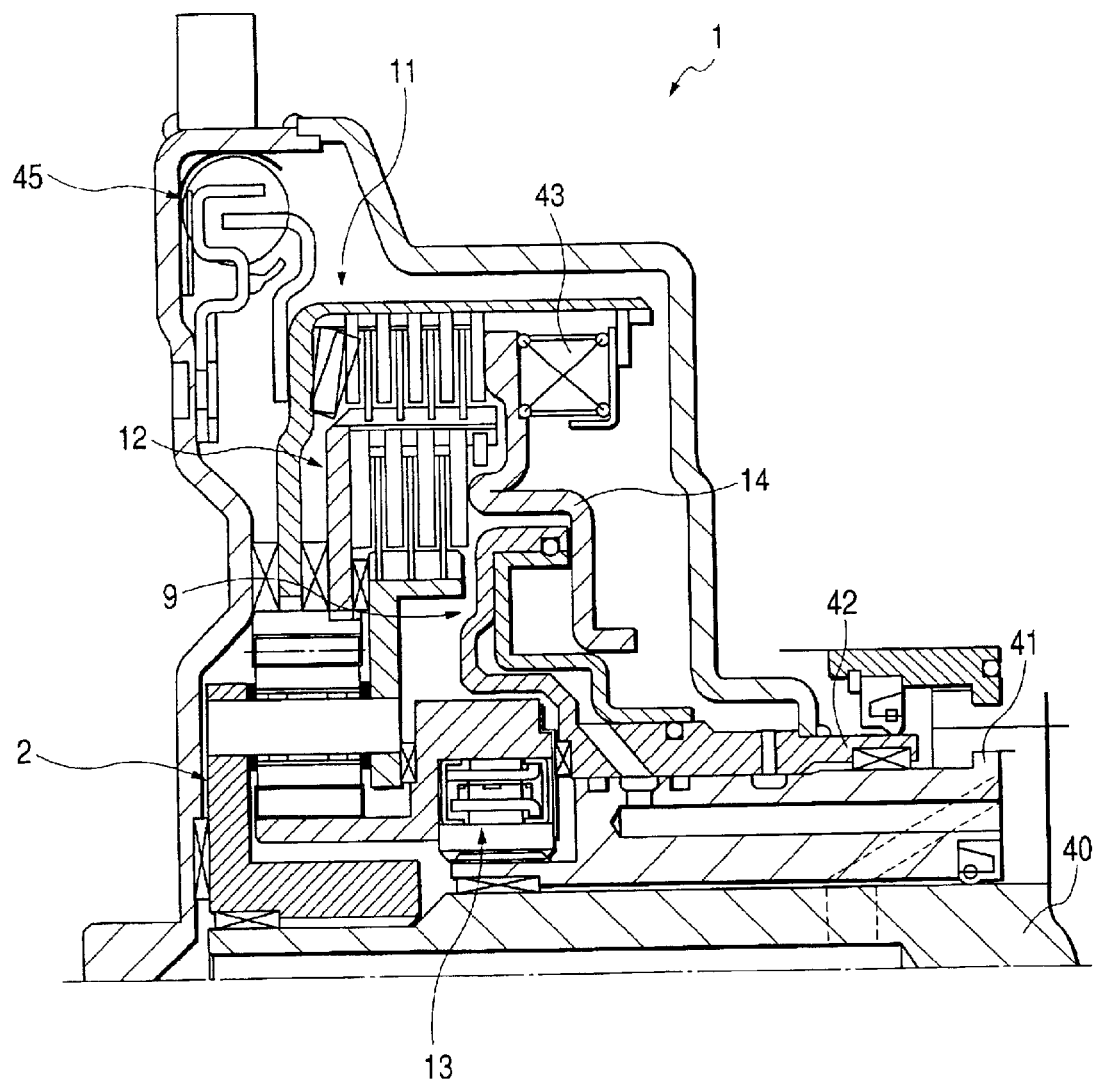
FIG. 6 is an axial sectional view showing the starting clutch of a sixth embodiment of the present invention.
Figure 7:
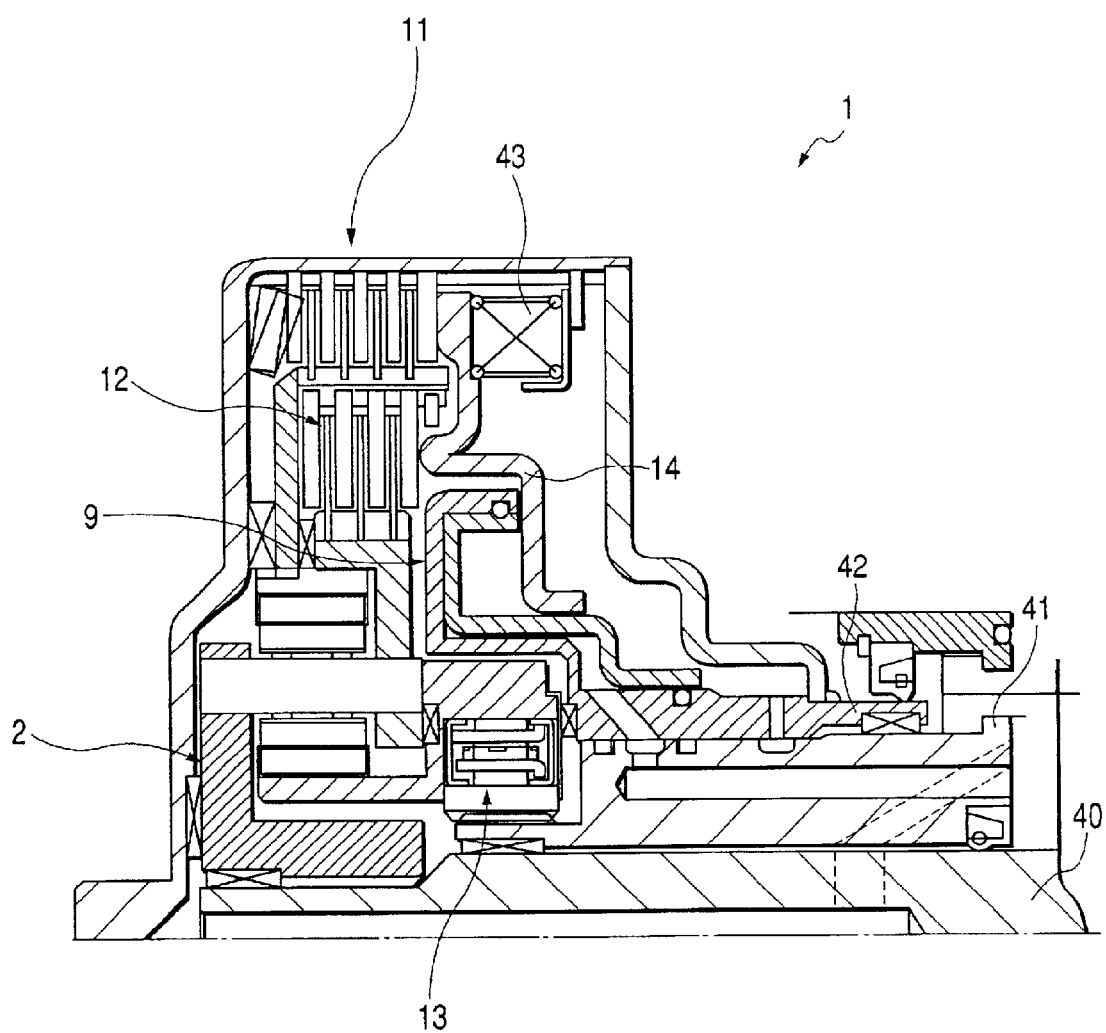
FIG. 7 is an axial sectional view showing the starting clutch of a seventh embodiment of the present invention.

FIG. 6 is an axial sectional view showing a starting clutch of a six embodiment of the present invention, and FIG. 7 is an axial sectional view showing a starting clutch of a seventh embodiment of the present invention. The basic structure of the sixth and the seventh embodiments is the same as that of the above described fifth embodiment. What is different is that, in the six embodiment, the reverse rotation preventive mechanism provided in the fifth embodiment is omitted, and in the seventh embodiment, the damper is further omitted from the constitution of the six embodiment.

Similarly to the above described first to fourth embodiments, in the fifth to seventh embodiments, in order to make a smooth running of the automobile at the beginning, it is necessary to slidably move the frictionally engaging element. Accordingly, the same operating patterns as those of the first to the fourth embodiments are required. However, the relationship between the operation (ON/OFF of oil pressure to cylinder) of the operating mechanism and the operation of the first and the second clutches 11 and 12 is reversed. The relation of the concrete operating patterns is shown in Table 2. Similarly to the above described table 1, X denotes the fastening of the clutch, Y the sliding movement of the clutch, and Z the release of the clutch, respectively.

TABLE 2

| Oil pressure | Completely OFF | Half Supply | | | Completely ON |
|---|---|---|---|---|---|
| First clutch | X | X | X | Y | Z |
| Second clutch | X | Y | Z | Z | Z |

One Example of Power Transmission Route

Figure 8:
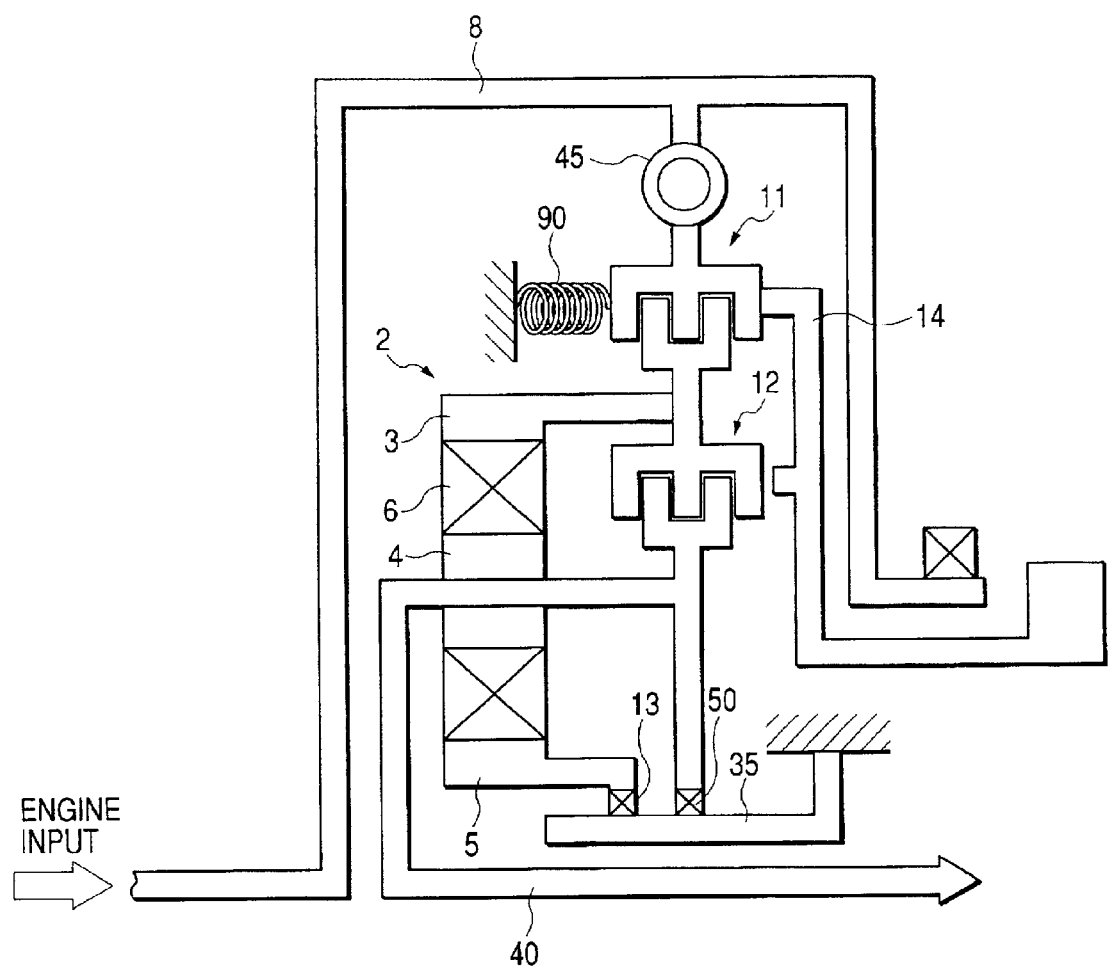
FIG. 8 is a view showing one example of power transmission routes of the starting clutch of each embodiment of the present invention.

FIG. 8 is a view showing one example of the power transmission routes in each embodiment of the present invention. The torque which was inputted from an engine side reaches the first clutch 11 from the case 8 through the damper 45. Although the first clutch 11 slidably rotates by a spring 90 which is biasing means, it is completely fastened by receiving the thrust of the piston 14 and transmits the torque to the second clutch and the ring gear 3 of the planetary gear 2. When the second clutch 12 is not fastened, the rotation of the ring gear 3 is reduced to a predetermined ratio by the pinion 6, and the torque is transmitted from the carrier 4 to the output shaft 40, and when the second clutch 12 is fastened, the torque is transmitted to the output shaft 40 with the same number of rotations as it was inputted. When the torque is inputted with the second clutch being in a non-fastening state, the reverse rotation of the sun gear 5 is prevented by the one-way clutch 13 arranged on a base member 35, and a reactive force, that is, a counter torque which came from the output shaft side by the reverse rotation preventive mechanism 50 is shut off.

Table 3 is a table showing the relationship between the operation of each clutch and variable speed in each embodiment of the present invention. C1 denotes the first clutch 11, C2 the second clutch 12 and F the one-way clutch 13, respectively, and * mark shows the fastening. Accordingly, the present table shows that the fastening of the first clutch 11 and the one-way clutch 13 makes a low (output of the amplified torque) and the fastening of the first clutch 11 and the second clutch 12 makes a high (output of the transmission ratio 1).

TABLE 3

| Clutch Output | C1 | C2 | F |
|---|---|---|---|
| Low | * | | * |
| High | * | * | |

Oil Pressure Circuit of the Fifth to the Seventh Embodiments

Figure 9:
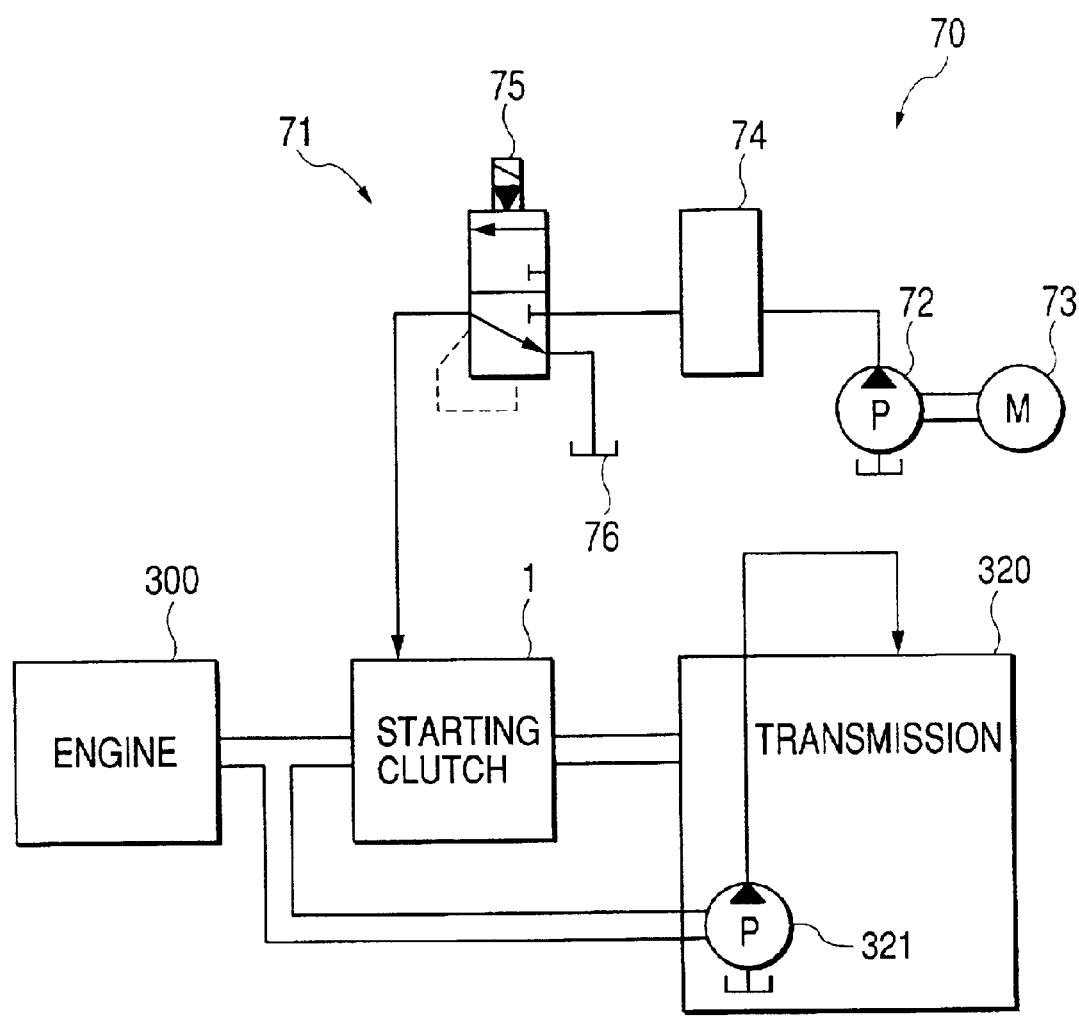
FIG. 9 is a schematic diagram showing one example of an oil pressure circuit used for an operating mechanism of the fifth to seventh embodiments.

FIG. 9 is a schematic diagram showing one example of oil pressure circuits used for operating mechanisms 70 of the fifth to the seventh embodiments. A transmission 320 is provided with an engine pump 321, which rotates with an engine 300 as a driving source, and supplies oil pressure and lubricant required inside the transmission 320. Also, independently apart from the oil pressure circuit including the engine pump 321, an oil pressure circuit 71 is provided, which includes a motor-operated pump 72 with an electric motor 73 as a driving source. The oil pressure circuit 71 is provided with a pressure regulator 74 for regulating pressure of the oil pressure supplied from the motor-operated pump 72 and an electromagnetic valve 75 for performing the switching of [supplying and drawing out] of the oil pressure.

The operation of the oil pressure circuit 71 is as follows. First, by the driving torque of the electric motor 73, the motor-operated pump 72 rotates so as to generate oil pressure, and this oil pressure is reduced to a predetermined pressure by the electromagnetic valve 74, and is transmitted to the electromagnetic valve 75. The oil pressure, which reaches the electromagnetic valve 75, is supplied as the electromagnetic valve 75 is opened when the piston 14 is operated so as to release the starting clutch 1, and the oil pressure is shut off as the electromagnetic vale 75 is closed when the fastening of the starting clutch 1 is performed. Incidentally, when the electromagnetic valve 75 is closed and the oil pressure is shut off, the oil pressure is drawn out, and the oil is discharged to an oil tank 76. With the constitution of the oil circuit arranged in this way, the oil pressure can be steadily supplied without any influence from the number of engine rotations.

Figure 10:
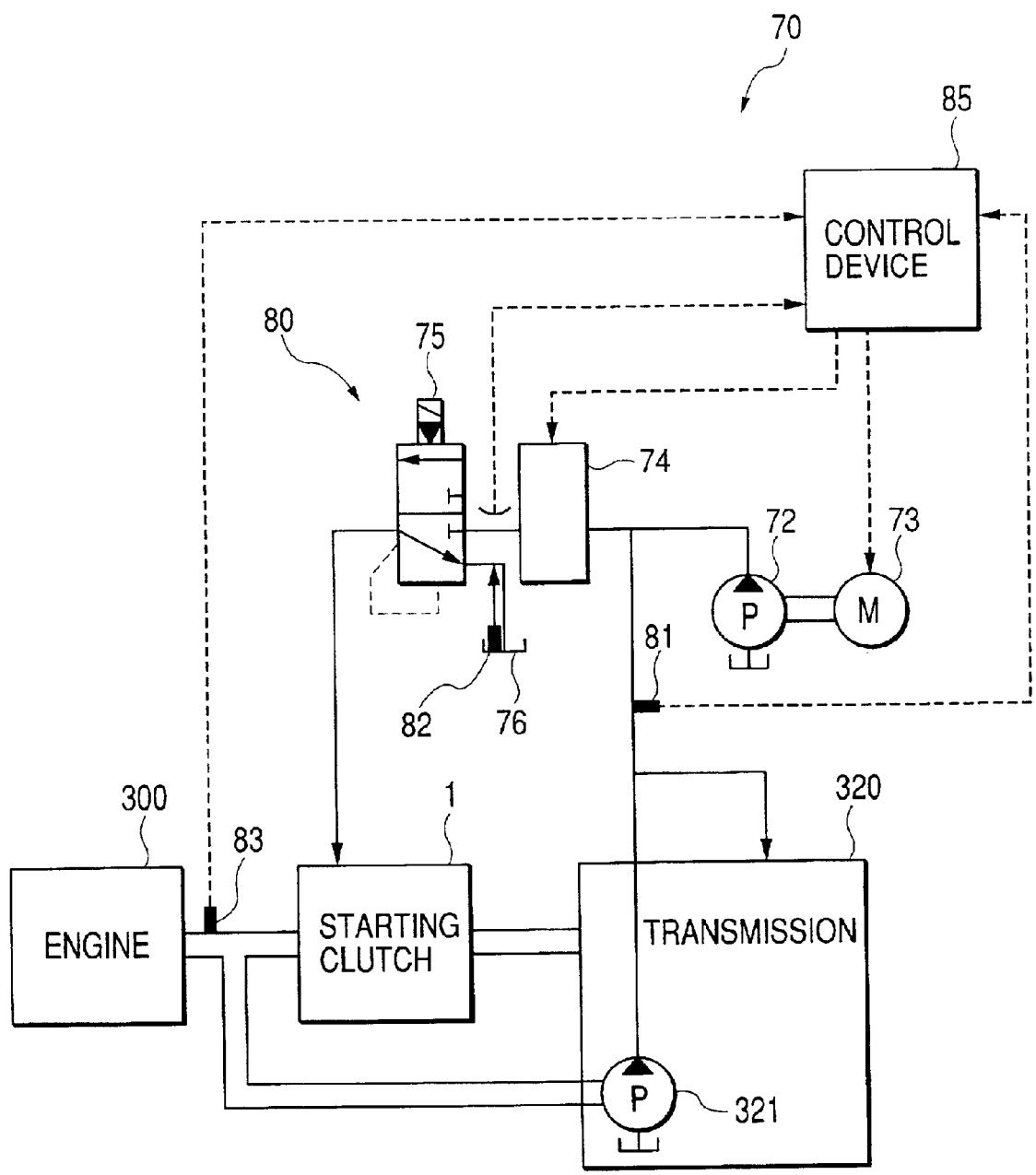
FIG. 10 is a schematic diagram showing the oil pressure circuit different from FIG. 9.
Figure 11:
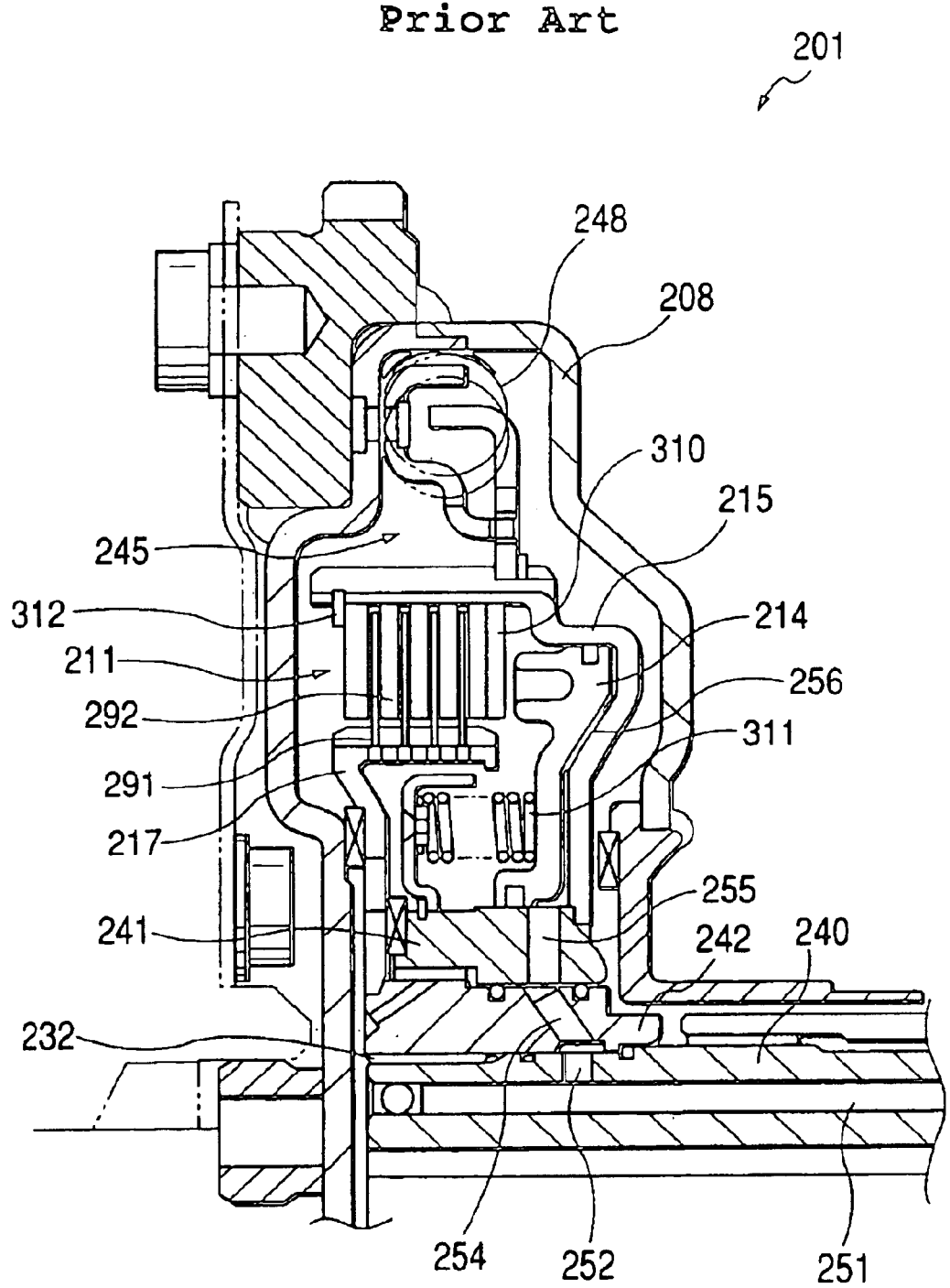
FIG. 11 is an axial sectional view of the conventional starting clutch.

FIG. 10 shows an example of other configuration of the operating mechanism 70 including other oil pressure circuit.

In the constitution as shown in FIG. 10, the engine pump 321 which rotates with the engine 300 as a driving source and the motor-operated pump 72 and the electric motor 72 with the electric motor 73 as a driving source are provided on the same oil pressure circuit 80. The oil pressure circuit 80 is provided with a mechanism for regulating the oil pressure supplied to the starting clutch 1 by the change in the number of rotations of the engine 300 so that the pressure does not becomes unsteady. It is substantially constituted as follows.

The oil pressure circuit 80 has the engine pump 321 which rotates with the engine 300 as a driving source and the motor-operated pump 72 with the electric motor 73 as a driving source and, further, has the pressure regulator 74 and the electromagnetic value 75. The oil pressures generated by both of the engine pump 321 and the motor-operated pump 72 are transmitted together to the pressure regulator 74. The oil pressures transmitted to the pressure regulator 74 are reduced to predetermined pressures and transmitted to the electromagnetic valve 72 side. The oil pressures reached to the electromagnetic valve 72 are, similarly to the example shown in FIG. 9, supplied as the electromagnetic valve 72 is opened when the piston 14 is operated so as to release the starting clutch 1, and the pressures are shut off as the electromagnetic valve 75 is closed when the fastening of the starting clutch is performed. Also, when the electromagnetic valve 75 is closed and the pressures are shut off, the oil pressures are similarly drawn out, and the oil is discharged to the oil tank 76.

Furthermore, the operating mechanism 70 is provided with a pressure detection sensor 81 for detecting pressure of the oil pressure generated by the engine pump 321, an engine rotational number detection sensor 83 and an oil temperature detection sensor 82 for detecting oil temperature of the oil inside the tank 76. The signals detected by each of these sensors are taken into the control device 85 and are subjected to a predetermined calculation and data processing so that the number of rotations of the electric motor 73 and the opening amount of the valve regulator 74 are regulated. For example, when a pressure higher than the pressure set up by the valve regulator 74 is detected by the pressure detection sensor 81, the electric motor 73 is stopped, or when a certain level of pressure, though lower than the pressure set up by the valve regulator 74 is detected, the number of rotations of the electric motor 73 is controlled so that a wasteful consumption of energy is controlled.

Also, the change in the number of engine rotations detected by the engine rotational number detection sensor 83 and the change of pressure detected by the pressure detection sensor 81 are taken into the control device 85 and subjected to the data processing, and a time difference between the change in the number of engine rotations and the change of pressure as well as a ratio of increase of the pressure for the change in the number of engine rotations are calculated so that the operation of the valve regulator 74 and the electric motor 73 is promptly controlled, thereby a wasteful consumption of energy is controlled and operation of the starting clutch can be smoothly performed.

Furthermore, among the wet type friction materials of the friction plate 91 used in the starting clutch, there are those whose friction factor changes due to oil temperatures. Particularly, there are those whose friction factor tends to be low when the oil temperature becomes high. Hence, the system was constituted in such a manner that the oil temperature inside the tank 76 is detected by the oil temperature sensor 82 and is taken into the control device 85 in which the relationship between the oil temperature and the friction factor is processed, thereby the setting value of the valve regulator 74 can be decided so that the piston 14 of the starting clutch 1 operates with an adequate thrust force.

Except that the above described first to fourth embodiments and the fifth to the seventh embodiments differ in the operation direction, they can be operated by the piston with nearly the same mechanism. Therefore, it is possible to perform the operation of the piston of the first to fourth embodiments by the above described operating mechanism and the oil pressure circuit, and it is possible in reverse to use the operating mechanism of the first to the fourth embodiments for the fifth to the seventh embodiments.

According to the above described starting clutch and control method of the starting clutch of the present invention, the effect as described below can be obtained.

Due to a variable speed mechanism comprising a planetary mechanism, it was possible to obtain the starting clutch and the control method of the starting clutch capable of outputting both of a normal torque and an amplified torque. Furthermore, thrust means for fastening the first and the second clutches was intervened so that the operating mechanism was operated only when the first and the second clutch were released, thereby making it possible to control a loss of energy such as a power loss of the engine.

What is claimed is:

1. A starting clutch, comprising:

a planetary mechanism;

a first clutch that outputs a torque to an outer diameter portion of said planetary mechanism;

a second clutch that outputs the torque to an intermediate portion of said planetary mechanism; and a lock mechanism that locks a reactive force from an inner diameter portion of said planetary mechanism, wherein a ring gear of said planetary mechanism is connected to a clutch case of said second clutch and an output shaft is connected through a carrier of said planetary mechanism to a hub of said second clutch; and a hill holder mechanism,
wherein said hill holder mechanism uses the hub of the second clutch or said carrier as an outer ring, and a sun gear or a member connected to the sun gear as an inner ring.

2. A starting clutch according to claim 1, wherein said planetary mechanism comprises a planetary gear.

3. A starting clutch according to claim 1, wherein the lock mechanism comprises a one-way clutch.

4. A starting clutch according to claim 1, wherein a multi-plate clutch is used for said first clutch and said second clutch.

5. A starting clutch according to claim 4, wherein a piston fastens said first clutch and said second clutch.

6. A starting clutch according to claim 4, wherein a hub of said first clutch is also the clutch case of said second clutch.

7. A starting clutch according to claim 2, wherein said starting clutch comprises a case that covers the planetary mechanism and a clutch case that covers said first clutch, wherein a bearing mechanism intervenes between said case and said clutch case.

8. A starting clutch according to claim 4, wherein a bearing mechanism intervenes between a clutch case of said first clutch and the hub.

9. A starting clutch according to claim 4, wherein a bearing mechanism intervenes between the clutch case of said second clutch and the hub.

10. A starting clutch according to claim 2, wherein a bearing mechanism intervenes between said clutch case of said second clutch and the planetary gear.

11. A starting clutch according to claim 7, wherein said bearing mechanism is a thrust washer, a needle bearing or a thrust ball bearing.

12. A starting clutch according to claim 2, further comprising an output shaft, wherein a bearing is intervened between said output shaft and said planetary gear.

13. A starting clutch according to claim 2, wherein a hub of said first clutch is connected to a ring gear of said planetary gear.

14. A starting clutch according to claim 2, wherein the hub of said second clutch is connected to a carrier of said planetary gear.

15. A starting clutch according to claim 1, wherein said output shaft is connected to said carrier.

16. A starting clutch according to claim 2, wherein a base member has a portion that is also an inner ring of a one-way clutch and is connected to a fixed element.

17. A starting clutch according to claim 13, wherein the hub of said first clutch and the ring gear are connected by a spline fitting.

18. A starting clutch according to claim 2, wherein an outer ring portion of a one-way clutch is formed on a sun gear or an inner periphery portion of a member connected to the sun gear.

19. A starting clutch according to claim 16, wherein the fixed element and the planetary gear are arranged on an outer periphery side of the output shaft and said base member and said one-way clutch are arranged on an outer periphery of said fixed element and, furthermore, said second clutch is arranged on an outer periphery side of said one-way clutch and said first clutch is arranged on an outer periphery side of said second clutch, respectively, and are covered by a case.

20. A starting clutch according to claim 1, wherein a fixed element and a planetary gear are arranged on an outer periphery side of an output shaft and a base member and a one-way clutch are arranged on the outer periphery of said fixed element and, furthermore, said second clutch is arranged on an outer periphery side of said planetary gear and said first clutch is arranged on an outer periphery side of said second clutch, respectively, and are covered by a case.

21. A starting clutch according to claim 1, further comprising a damper mechanism.

22. A starting clutch according to claim 21, wherein said damper mechanism includes a retainer plate fixed to said case, a claw member spline-fitted on an outer periphery of a clutch case of the first clutch and a spring intervened between a retainer plate and the claw member.

23. A starting clutch according to claim 1, wherein an operation of a piston that fastens the first clutch or the second clutch is through an operating mechanism comprises a lever and a release bearing.

24. A starting clutch, comprising:
a planetary mechanism;
a first clutch that outputs a torque to an outer diameter portion of said planetary mechanism;
a second clutch that outputs the torque to an intermediate portion of said planetary mechanism; and
a lock mechanism that locks a reactive force from an inner diameter portion of said planetary mechanism, wherein a ring gear of said planetary mechanism is connected to a clutch case of said second clutch and an output shaft is connected through a carrier of said planetary mechanism to a hub of said second clutch, and a piston that fastens the first clutch or the second clutch utilizes a ball screw as an operating mechanism.

25. A starting clutch according to claim 1, wherein a piston that fastens the first clutch or the second clutch uses a release bearing and a ball screw, that pushes down the release bearing, as an operating mechanism.

26. A starting clutch according to claim 1, wherein a piston that fastens the first or the second clutch operates by oil pressure.

27. A starting clutch according to claim 1, wherein a piston that fastens the first clutch or the second clutch operates by oil pressure supplied from a motor-operated pump.

28. A starting clutch according to claim 1, wherein an oil pressure circuit including a motor-operated pump is provided that uses an engine pump as an oil pressure source.

29. A starting clutch according to claim 28, wherein an oil pressure circuit that includes the oil pressure circuit including said motor-operated pump and said engine pump as an oil pressure source also includes a device that detects the number of engine rotations, the oil pressure circuit comprising a valve to be regulated according to the number of engine rotations detected by said device.

30. A starting clutch according to claim 29, further comprising:
a device that detects oil pressure generated by said engine pump; and
a control device that regulates the operation of said motor-operated pump according to oil pressure generated by said engine pump.

31. A starting clutch according to claim 28, further comprising an oil temperature detection device, wherein a mechanism regulates an opening amount of a valve by the detected oil temperature.

32. A starting clutch according to claim 1, wherein a piston that fastens the first clutch or the second clutch operates by an electromagnet.

33. A starting clutch according to claim 1 or 24, wherein a biasing device is provided that biases a frictionally engaging element of the first clutch to such a degree that a creep torque is generated.

34. A starting clutch according to claim 33, wherein a biasing regulating device that regulates a biasing force of said biasing device is provided.

35. A starting clutch according to claim 34, wherein said biasing device or biasing regulating device includes a spring member.

36. A starting clutch according to claim 35, wherein said spring member is a Belleville spring.

37. A starting clutch according to claim 1 or 24, wherein an amplified torque is output by the fastening of said first clutch and said second clutch.

38. A starting clutch according to claim 1 or 24, wherein an amplified torque having 1 in a ratio of transmission is output by the fastening of said first clutch and said second clutch.

39. A starting clutch according to claim 1 or 24, wherein an operating mechanism of the first or the second clutch is arranged on an outer periphery side of a fixed element.

40. A Starting clutch according to claim 1 or 24, wherein, when an operating mechanism is completely ON, the first clutch and the second clutch fasten together and, when the operating mechanism is completely OFF, the first clutch and the second clutch are released.

41. A starting clutch according to claim 1 or 24, wherein the first clutch fastens or slidably moves in a half operating state intermediate between a completely ON and a completely OFF state.

42. A starting clutch according to claim 41, wherein the second clutch slidably moves or is released in said half operating state.

43. A starting clutch according to claim 1, wherein a coupled driving rotational element is arranged on an outer periphery of a fixed element and, furthermore, a piston is arranged on the outer periphery.

44. A starting clutch according to claim 43, wherein a cylinder and an oil chamber of said cylinder are provided on said coupled driving rotational element.

45. A starting clutch according to claim 44, wherein the piston is separated from a frictionally engaging element by the operation of said cylinder.

46. A starting clutch according to claim 43, wherein a thrust member for fastening the first clutch and the second clutch by thrusting said piston is provided.

47. A starting clutch according to claim 46, wherein said thrust member is a spring member.

48. A starting clutch according to claim 47, wherein said spring member intervenes between a support plate supported on an inner periphery of the clutch case of the first clutch by a snap ring and the piston.

49. A starting clutch according to claim 43, wherein an oil passage from said fixed element to an oil chamber through said coupled driving rotational element is provided.

50. A starting clutch according to claim 49, wherein an oil passage from said output shaft to said oil chamber through said fixed element and said coupled driving rotational element is provided.

51. A starting clutch according to claim 43, wherein an outer periphery side of said coupled driving rotational element is closed with an oil seal.

52. A starting clutch according to claim 43, wherein the outer periphery of said fixed element is supported by a bearing.

53. A starting clutch according to claim 43, wherein the outer periphery side of said fixed element is supported by a seal bearing.

54. A starting clutch according to claim 1 or 24, wherein lubricant is supplied from the output shaft to the first clutch, the second clutch, a one-way clutch, and the planetary gear.

55. A starting clutch according to claim 54, wherein a lubricant oil supply hole is provided on said output shaft.

56. A starting clutch according to claim 43, wherein a lubricant oil supply hole is provided in said fixed element.

57. A starting clutch according to claim 43, wherein a lubricant oil passage which communicates with said output shaft from said fixed element is provided.

58. A starting clutch according to claim 1 or 24, wherein lubricant is supplied from a gap between said output shaft and a fixed element.

59. A starting clutch according to claim 1 or 24, wherein an inside of the clutch case is immersed in oil.

60. A starting clutch according to claim 43, wherein the first and the second clutches are fastened when the operating mechanism is completely OFF, and the first and the second clutches are released when the operating mechanism is ON.

61. A starting clutch according to claim 43, wherein only the first clutch fastens or slidably moves when an operating mechanism is in a half operating state.

62. A starting clutch according to claim 42, wherein a creep is generated by said first or the second clutch slidably moving.

63. A control method of a starting clutch, the starting clutch comprising:
   a planetary mechanism;
   a first clutch that outputs a torque to an outer diameter portion of said planetary mechanism;
   a second clutch that outputs the torque to an intermediate portion of said planetary mechanism; and
   a lock mechanism that locks a reactive force from an inner diameter portion of said planetary mechanism, wherein a ring gear of said planetary mechanism is connected to a clutch case of said second clutch and an output shaft is connected through a carrier of said planetary mechanism to a hub of said second clutch; and
   a hill holder mechanism,
      wherein said hill holder mechanism uses the hub of the second clutch or said carrier as an outer ring, and a sun gear or a member connected to the sun gear as an inner ring,
   the method comprising:
      outputting an amplified torque by the fastening of said first clutch and said second clutch.

64. A control method of a starting clutch according to claim 63, wherein a torque having 1 in a ratio of transmission is output by the fastening of said first clutch and said second clutch.

65. A control method of a starting clutch according to claim 63, wherein, when an operating mechanism is completely ON, the first clutch and the second clutch are fastened together and, when the operating mechanism is completely OFF, the first clutch and the second clutch are released.

66. A control method of a starting clutch according to claim 65, wherein said first clutch is fastened or slidably moved in a half operating state intermediate between said completely ON and said completely OFF state.

67. A control method of a starting clutch according to claim 65, wherein said second clutch is fastened or slidably moved in a half operating state intermediate between said completely ON and said completely OFF state.

68. A control method of a starting clutch according to claim 63, wherein, when an operating mechanism is completely OFF, the first and the second clutches are fastened and, when the operating mechanism is completely ON, the first and the second clutches are released.

69. A control method of a starting clutch according to claim 68, wherein said operating mechanism fastens or slidably moves the first clutch only in a half operating state intermediate between said completely ON and said completely OFF state.

70. A control method of a starting clutch according to claim 66, wherein a creep is generated by said first clutch slidably moving.

71. A starting clutch according to claim 2, wherein the lock mechanism for locking the reactive force from said inner portion comprises a one-way clutch.

72. A starting clutch according to claim 5, wherein a bearing mechanism intervenes between the clutch case of said first clutch and the hub.

73. A starting clutch according to claim 5, wherein a bearing mechanism intervenes between the clutch case of said second clutch and the hub.

74. A starting clutch according to claim 14, wherein said hub and said carrier are connected by a spline fitting.

75. A starting clutch according to claim 15, wherein said output shaft and said carrier are connected by a spline fitting.

76. A starting clutch according to claim 16, wherein said base member and said fixed element are connected by a spline fitting.

77. A starting clutch according to claim 29, further comprising an oil temperature detection device, wherein a mechanism that regulates an opening amount of the valve by the detected oil temperature is provided.

78. A starting clutch according to claim 30, further comprising an oil temperature detection device, wherein a mechanism that regulates an opening amount of the valve by the detected oil temperature is provided.

79. A starting clutch according to claim 34, wherein said biasing device or biasing regulating device includes a spring member.

80. A starting clutch according to claim 79, wherein said spring member is a Belleville spring.

81. A starting clutch according to claim 44, wherein the piston is separated from a frictionally engaging element by the operation of said cylinder.

82. A starting clutch according to claim 56, wherein a lubricant oil passage which communicates with said output shaft from said fixed element is provided.

83. A control method of a starting clutch according to claim 64, wherein, when the operating mechanism is completely ON, the first clutch and the second clutch are fastened together and, when the operating mechanism is completely OFF, the first clutch and the second clutch are released.

84. A control method of a starting clutch according to claim wherein said first clutch is fastened or slidably moved in a half operating state intermediate between said completely ON state and said completely OFF state.

85. A control method of a starting clutch according to claim 83, wherein said second clutch is fastened or slidably moved in a half operating state intermediate between said completely ON state and said completely OFF state.

86. A control method of a starting clutch according to claim 64, wherein, when an operating mechanism is completely OFF, the first and the second clutches are fastened and, when the operating mechanism is completely ON, the first and the second clutches are released.

87. A control method of a starting clutch according to claim 86, wherein said operating mechanism fastens or slidably moves the first clutch only in a half operating state intermediate between said completely ON state and said completely OFF state.

88. A control method of a starting clutch according to claim 84, wherein a creep is generated by said first clutch slidably moving.

89. A control method of a starting clutch, the starting clutch comprising:

a planetary mechanism;

a first clutch that outputs a torque to an outer diameter portion of said planetary mechanism;

a second clutch that outputs the torque to an intermediate portion of said planetary mechanism;

a lock mechanism that locks a reactive force from an inner diameter portion of said planetary mechanism, wherein a ring gear of said planetary mechanism is connected to a clutch case of said second clutch and an output shaft is connected through a carrier of said planetary mechanism to a hub of said second clutch., and wherein a piston that fastens the first clutch or the second clutch utilizes a ball screw as an operating mechanism, the method comprising:

outputting an amplified torque by the fastening of said first clutch and said second clutch.

* * * * *